United States Patent
Jeong et al.

(10) Patent No.: US 7,143,034 B2
(45) Date of Patent: Nov. 28, 2006

(54) DYNAMIC TIME WARPING DEVICE FOR DETECTING A REFERENCE PATTERN HAVING A SMALLEST MATCHING COST VALUE WITH RESPECT TO A TEST PATTERN, AND SPEECH RECOGNITION APPARATUS USING THE SAME

(75) Inventors: Hong Jeong, Pohang (KR); Yong Kim, Suwon (KR)

(73) Assignee: Postech Foundation, Pohang (KR)

( * ) Notice: Subject to any disclaimer, the term of this patent is extended or adjusted under 35 U.S.C. 154(b) by 832 days.

(21) Appl. No.: 10/277,978

(22) Filed: Oct. 23, 2002

(65) Prior Publication Data

US 2004/0049387 A1 Mar. 11, 2004

(30) Foreign Application Priority Data

Sep. 11, 2002 (KR) ...................... 10-2002-0054940

(51) Int. Cl.
*G10L 15/12* (2006.01)
(52) U.S. Cl. ..................................... 704/241
(58) Field of Classification Search .................. None
See application file for complete search history.

(56) References Cited

U.S. PATENT DOCUMENTS 6,304,844 B1 * 10/2001 Pan et al. ................... 704/257

6,983,246 B1 * 1/2006 Kepuska et al. ............ 704/241

* cited by examiner

*Primary Examiner*—Susan McFadden
(74) *Attorney, Agent, or Firm*—Rothwell, Figg, Ernst & Manbeck, P.C.

(57) ABSTRACT

Provided are a dynamic time warping device using speech recognition software, and a speech recognition apparatus using the same. The dynamic time warping device includes memory units for processing characterization vectors of a test pattern and a predetermined reference pattern using a FIFO queue, and a plurality of processing elements serially connected to each other, the plurality of processing elements multiplying a predetermined weight by a difference between the characterization vectors of the test and reference patterns, which are obtained by shifting them in the opposite directions, adding the multiplication result to matching cost values of adjacent nodes, and comparing the addition results to detect the smallest matching cost value. Accordingly, fast speech recognition can be realized by embedding speech recognition software using a dynamic time warping algorithm into hardware. Also, it is possible to increase a recognition rate of speech by adjusting weight according to a node to be compared, and provide a dynamic time warping device that can be mass-produced as application-specification integrated circuits (ASICs). Further, a compact speech recognition apparatus using the dynamic time warping device can be provided without requiring a computer to drive software for speech recognition.

7 Claims, 9 Drawing Sheets

DYNAMIC TIME WARPING DEVICE FOR DETECTING A REFERENCE PATTERN HAVING A SMALLEST MATCHING COST VALUE WITH RESPECT TO A TEST PATTERN, AND SPEECH RECOGNITION APPARATUS USING THE SAME

BACKGROUND OF THE INVENTION

1. Field of the Invention

This application claims the priority of Korean Patent Application No. 2002-54940, filed Sep. 11, 2002 in the Korean Intellectual Property Office, which is incorporated herein in its entirety by reference.

The present invention relates to a speech recognition apparatus, and more particularly, to a device for performing a dynamic time warping method for speech recognition and a speech recognition apparatus using the device.

2. Description of the Related Art

According to a general speech recognition method, a test pattern, which is obtained by patterning a speech signal to be suitably recognized for matching, is matched with a plurality of reference patterns that are in advance stored corresponding to words to be recognized. Next, a reference pattern, which is selected to most suitably match the test pattern, is recognized as the word of an input speech signal.

To classify the best matching reference pattern, various pattern classification methods are used. Among these there are a hidden markov model (HMM) method that statistically models a test pattern and classifies reference patterns, a time delay neural network (TDNN) method, and a dynamic time warping (DTW) method that enables effective classification of the optimum reference pattern even if there is a difference between the length of times of a test pattern and a reference pattern.

Conventionally, for classification of the optimum reference pattern, speech recognition software must be stored in a general computer and then operated by the computer. This triggers a need to develop a hardware that is small sized and operates at a high speed and with a high speech recognition ratio, using a speech recognition system based on a speech recognition software for dynamically time warping of a test pattern and a reference pattern.

SUMMARY OF THE INVENTION

To solve the above and other problems, it is a first object of the present invention to provide a dynamic time warping device with a small chip size and a high word recognition ratio with respect to a speech signal that can be mass-produced as application-specification integrated circuits (ASICs).

It is a second object of the present invention to provide a speech recognition apparatus to which the dynamic time warping device is applied.

To achieve the above and other objects, there is provided a dynamic time warping device for detecting a reference pattern having a smallest matching cost value with respect to a test pattern, the device including a test pattern memory unit for receiving P characterization vectors included in the test pattern in chronological order, shifting the received P characterization vectors using a first-in first out (FIFO) queue in response to an operating clock signal; a reference memory unit for storing a plurality of reference patterns corresponding to a plurality of words, and outputting P characterization vectors included in the reference pattern in chronological order; a processing unit to which (2P−1)=N processing elements are serially connected, first and second ends of the serially connected processing elements are connected to an output of the test pattern memory unit and the reference pattern memory unit, respectively, so as to shift the characterization vectors included in the test pattern, and to shift the characterization vectors included, in the reference pattern in the opposite direction with respect to the previous shifted characterization vectors, each processing element calculating matching cost values using a difference between the characterization vectors and matching cost values of adjacent processing elements, and selecting the smallest one from the matching cost values produced in the processing elements to output the smallest value as the smallest matching cost value of an input reference pattern; and a matching result decision unit for outputting the index of a word of a reference pattern having the smallest matching cost value out of matching cost values of the plurality of reference patterns output from the processing unit.

The processing unit performs the operations of: adding matching cost values to a difference between the characterization vectors of the test and reference patterns sequentially input from each processing element, where the matching cost values are produced by processing elements adjacent to the current processing element in response to a clock output right before a current clock, and the difference is multiplied by a weight; selecting the smallest value out of the addition results as a smallest matching cost value of a processing element; comparing smallest matching cost values produced by the adjacent processing elements in chronological order; and outputting the smallest matching cost value out of the matching cost values as the smallest matching cost between the test and reference patterns.

An initial value of the processing element in the midst of the processing elements in the processing unit is set to 1, and those of the remaining processing elements are set to infinite values.

Adjacent processing elements of the processing unit alternately produce a smallest matching cost.

Also, the processing element corresponding to a node (i,j) of the processing unit includes a first circuit block and a second circuit block. The first circuit block includes a subtracter outputting a difference between the characterization vectors of the test pattern and the characterization vectors of the reference pattern, both characterization vectors being input to the subtracter in chronological order; a multiplier multiplying the difference by a predetermined weight; first and third adders adding an output of the multiplier to smallest matching cost values of nodes D(i−1, j+1) and D(i−1,j−1), respectively; a second adder adding an output of the subtracter to smallest matching cost values of a node (i−1,j); a first comparator outputting the smallest matching cost value out of outputs of the first through third adders; and a first delayer delaying the smallest matching cost value for one clock and outputting it as a matching cost value of the node (i−1,j). The second circuit block includes a second comparator receiving the matching cost value of the node D(i−1,j+1) and the matching cost value of the node D(i−1,j) output from the first delayer, and outputting the smallest value; and a second delayer delaying an output of the second comparator for one clock. Here, i denotes a $0^{th}$ pulse of the operating clock defined when the characterization vectors of the test and reference patterns produce a value for firstly matching the central processing element, and being increased by 1 whenever a matching cost value is produced due to application of a clock to the processing element, and j denotes a $j^{th}$ processing element.

The first circuit block is executed at an $i^{th}$ pulse of the operating clock (i=0, 1, ..., N−1), and the second circuit block is executed at an $i^{th}$ pulse of the operating clock (i=N, N+1, ..., 2N−1).

The weight, which is multiplied by the difference by the multiplier, is set to 2.

To achieve the above and other objects, there is provided a speech recognition apparatus including an A/D converter converting an analog speech signal into a digital speech signal; a characterization vector producing unit including filter banks and for producing characterization vectors of a test pattern from the digital speech signal; a test pattern memory unit for receiving P characterization vectors included in the test pattern in chronological order in response to a clock signal, and shifting and outputting the P characterization vectors using a FIFO queue; a reference pattern memory unit for storing a plurality of reference patterns corresponding to a plurality of words, and outputting P characterization vectors included in the reference patterns in chronological order; a processing unit to which (2P−1)=N processing elements are serially connected, first and second ends of the serially connected processing elements are connected to an output of the test pattern memory unit and the reference pattern memory, respectively, so as to shift the characterization vectors included in the test pattern, and to shift the characterization vectors in the reference pattern in the opposite direction with respect to the previous shifted characterization vectors, each processing element calculating matching cost values using a difference between the characterization vectors and matching cost values of adjacent processing elements, and selecting the smallest matching cost value to output it as the smallest matching cost value of an input reference pattern; and a matching result decision unit outputting the index of a word of a reference pattern having the smallest matching cost value out of matching cost values of the plurality of reference patterns output from the processing unit.

The processing element corresponding to a node (i,j) of the processing unit comprises a first circuit block and a second circuit block. The first circuit block includes a subtracter outputting a difference between the characterization vectors of the test pattern and the characterization vectors of the reference pattern, both characterization vectors being input to the subtracter in chronological order; a multiplier multiplying the difference by a predetermined weight; first and third adders adding an output of the multiplier to smallest matching cost values of nodes D(i−1, j+1) and D(i−1,j−1), respectively; a second adder adding an output of the subtracter to smallest matching cost values of a node (i−1,j); a first comparator outputting the smallest matching cost value out of outputs of the first through third adders; and a first delayer delaying the smallest matching cost value for one clock and outputting it as a matching cost value of the node (i−1,j). The second circuit block includes a second comparator receiving the matching cost value of the node D(i−1,j+1) and the matching cost value of the node D(i−1,j) output from the first delayer, and outputting the smallest value; and a second delayer delaying an output of the second comparator for one clock. Here, i denotes a $0^{th}$ pulse of the operating clock defined when the characterization vectors of the test and reference patterns produce a value for firstly matching the central processing element, and being increased by 1 whenever a matching cost value is produced due to application of a clock to the processing element, and j denotes a $j^{th}$ processing element.

BRIEF DESCRIPTION OF THE DRAWINGS

The above and other objects and advantages of the present invention will become more apparent by describing in detail preferred embodiments thereof with reference to the attached drawings in which.

DETAILED DESCRIPTION OF THE INVENTION

Figure 1:
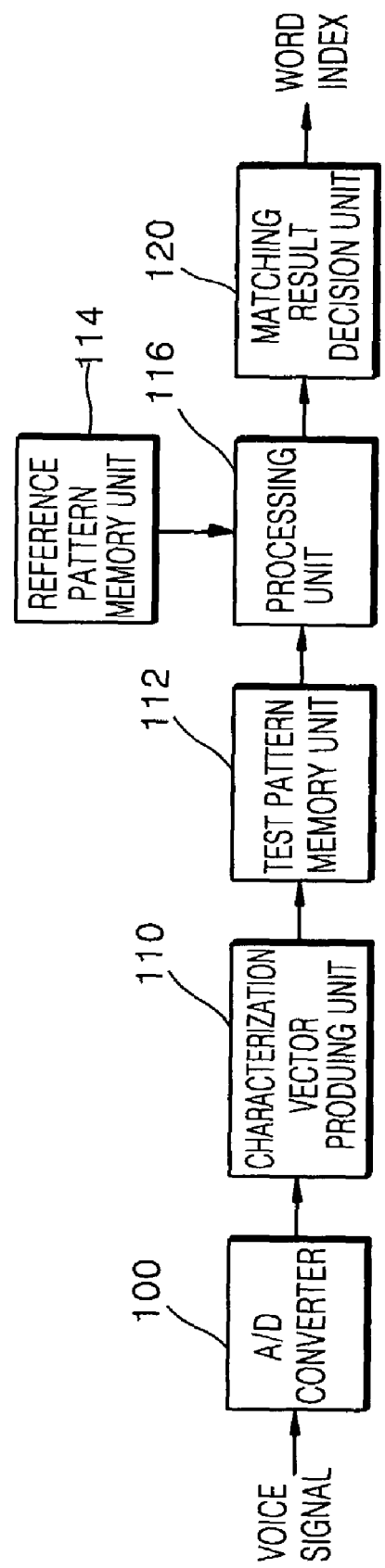
FIG. 1 is a block diagram of a speech recognition apparatus according to the present invention.

FIG. 1 is a block diagram of a speech recognition apparatus according to the present invention. Referring to FIG. 1, the speech recognition apparatus includes an A/D converter 100 that converts an input analog speech signal into a digital speech signal, a characterization vector producing unit 110 that produces a characterization vector from a digital speech signal; a test pattern memory unit 112 that stores a test pattern composed of characterization vectors, a reference pattern memory 114 that stores reference patterns composed of characterization vectors corresponding to the speech of words to be recognized, a processing unit 116 that consists of a plurality of processing elements, and receives a test pattern and a reference pattern from the test pattern memory unit 112 and the reference pattern memory unit 114, respectively, and calculates the smallest matching cost value of the received reference pattern, and a matching result decision unit 120 that outputs an index of a word corresponding to the reference pattern having the smallest matching cost value out of the output plurality of reference patterns.

The A/D converter 100 samples and quantizes an analog speech signal to convert it into a digital speech signal. The characterization vector production unit 110 produces a characterization vector to be used in patterning the digital speech signal. A filter bank (not shown), which is included in the characterization vector production unit 110, produces twenty characterization vectors per second. If a word is pronounced for two seconds, forty characterization vectors are produced.

The test pattern memory unit 112 stores input characterization vectors as one test pattern and transmits the test pattern to the processing unit 116. The processing unit 116 and the matching result decision unit 120, which will described later, receive the characterization vectors of the reference pattern, which was stored in advance, in chronological order, select the best matching reference pattern, and outputs the index of a word corresponding to the best matching reference pattern.

Figure 2:
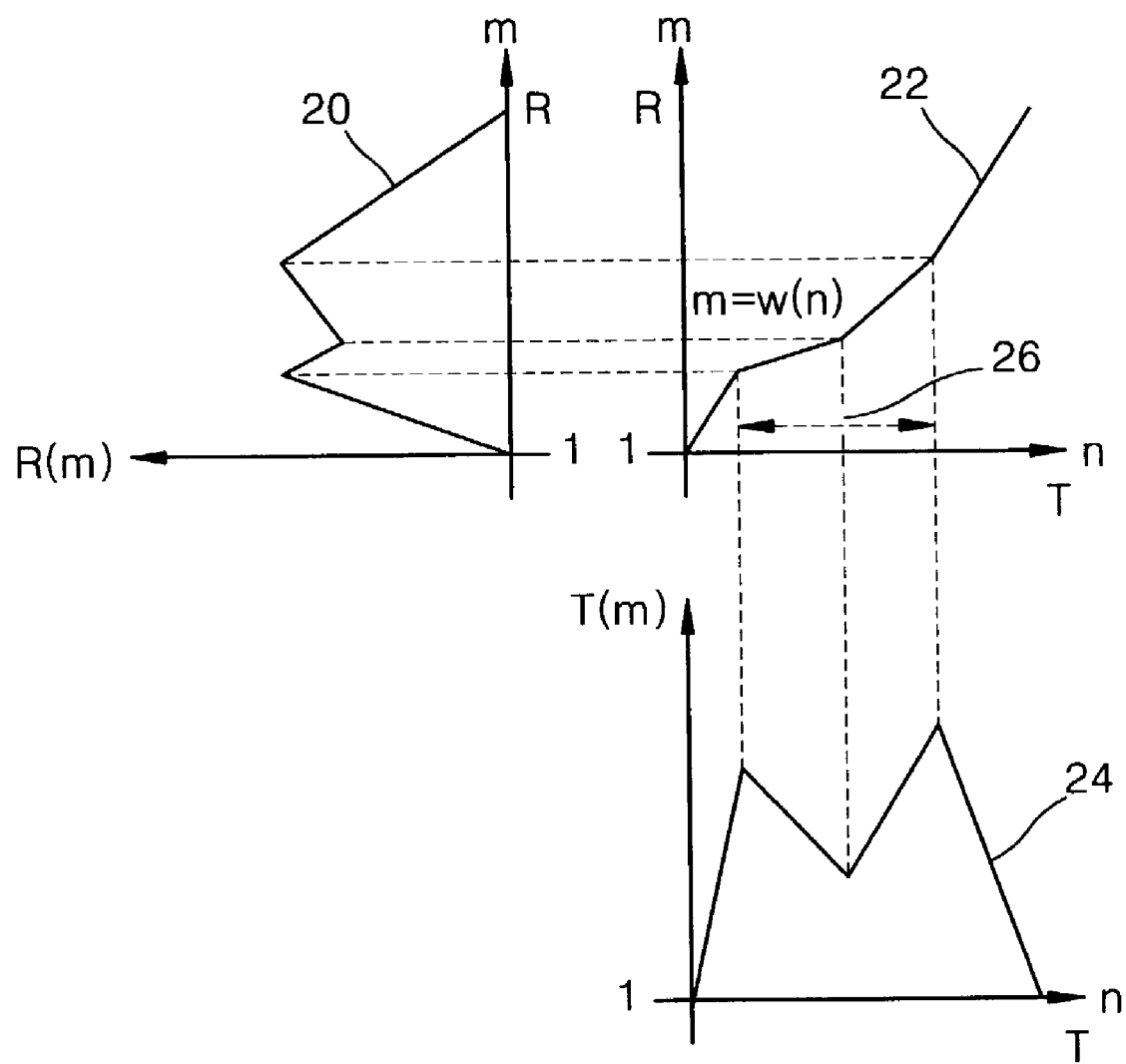
FIG. 2 shows graphs for explaining the concept of a dynamic time warping method.

FIG. 2 shows graphs for briefly explaining the basic concept of a dynamic time warping method. Referring to FIG. 2, reference numerals 20 and 24 denote a predetermined reference pattern, which is set in advance according to each word, and a test pattern showing the locus of characterization vectors obtained from an input speech signal, respectively. In general, the pronunciation length of the same word may be different depending on an individual's speaking habit. For this reason, it is not proper to determine whether a test pattern and a reference pattern are similar to each other according to pronunciation time of a word. In consideration of this, a dynamic time warping method detects the locus of a central region 26 of a warping function 22 to compare the reference pattern 20 with the test pattern 24 regardless of the pronunciation time of a word.

The number of characterization vectors of a test pattern, which is obtained from a speech signal to be matched with a reference pattern, may be arbitrarily determined by a designer of a speech recognition chip. Also, any nth test pattern having p characterization vectors can be described as $T(n)=\{t_k(n)|k=0, 1, \ldots, P-1\}$. Similarly, when there are Nw different reference words, a reference pattern for an rth word may be defined by $R(m)=\{r_l(m)|l=0, 1, \ldots, L-1\}$. Here, $r_l(m)$ denotes a characterization vector and r has a range of $r \in |0, 1, \ldots, M-1|$. The reference pattern is predetermined, and thus, it is possible to know the number of characterization vectors of a reference pattern for each word.

Figure 3:
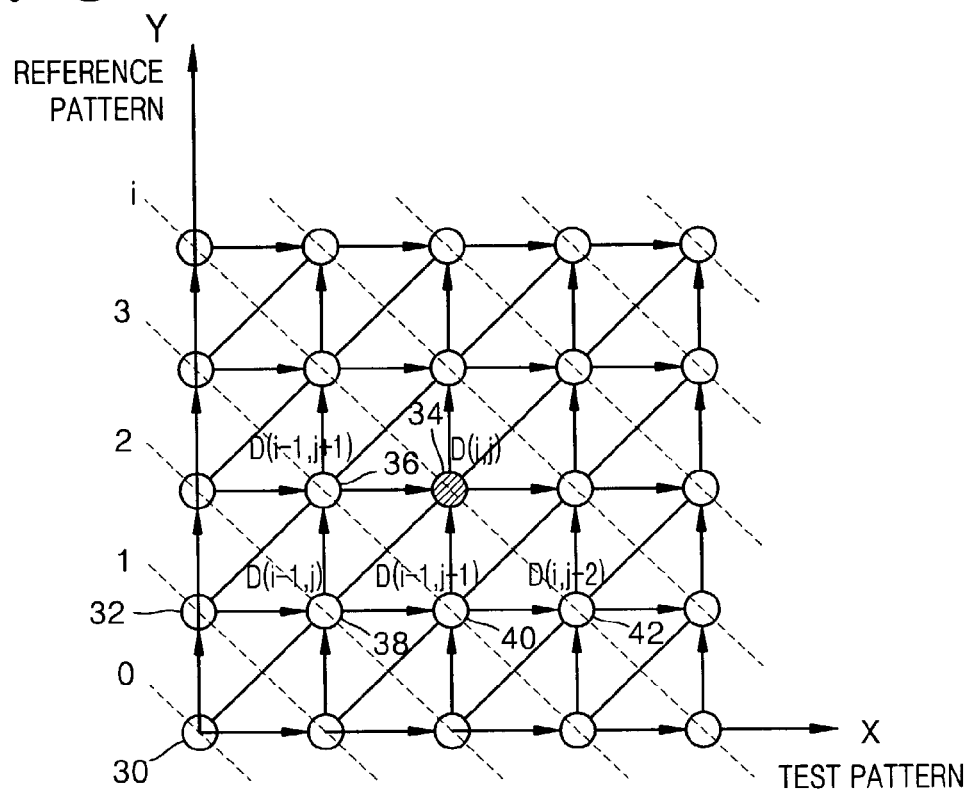
FIG. 3 is a graph illustrating a dynamic time warping algorithm applied in the present invention.

FIG. 3 is a graph illustrating a dynamic time warping algorithm according to the present invention. Referring to the graph of FIG. 3, nodes of white circles store the smallest matching cost value from an origin node 30 to each node. The X-axis indicates the position of each characterization vector constituting a test pattern and the Y-axis indicates the position of each characterization vector constituting a reference pattern. Also, the numbers corresponding to dot lines from the upper left parts to the lower right parts, indicate an order of calculating matching cost values applied to the present invention, that is, the matching cost values are sequentially processed according to clocks input to a dynamic time warping device.

First, a matching cost value of the origin node 30 is obtained by calculating a difference between the first characterization pattern of the test pattern and the first characterization vector of the reference pattern. A matching cost value of a node 32 is obtained by calculating a difference between the first characterization vector of the test pattern and the second characterization vector of the reference pattern, multiplying the difference by a weigh, and adding a matching cost value of the origin node 30 to the multiplication result.

In D(i,j) of a node 34, i denotes the number of clocks from a starting point of a comparison of the reference and test patterns to a current point, j denotes a processing element, which will be described later, and which processes and outputs a signal input to each node. The D(i,j) of the node 34 indicates the smallest cost value matched along the optimum path from the origin node 30 to the node 34. D(i,j–2) of a node 42 operates at the same instant of time when the D(i,j) of the node 34 operates, and indicates a processing element that is secondly connected from the right. Here, a comparison of two patterns at the origin 30 is based on an assumption that the starting points of pronunciation of words of these patterns are the same.

For calculation of the smallest matching cost value for the D(i,j) of the node 34, there is a need to know the smallest matching coast values stored at D(i–1,j–1), D(i–1,j), and D(i–1,j+1) of three nodes 36, 38, and 40. The smallest matching cost value for the D(i,j) of the node 34 is obtained by limiting the numbers of nodes adjacent to the node 34 D(i,j) to three along paths from the origin node 30 to the node 34 D(i,j) and detecting the smallest one of the matching cost values of the three nodes in consideration of the weight. More specifically, with respect to the node 34, first, a difference between the third characterization vectors at the reference pattern and the test pattern is calculated. Next, the matching cost values of the two nodes 36 and 40, i.e., D(i–1,j+1) and D(i–1,j–1), adjacent to the node 34 in the horizontal and vertical directions are added with the double of the difference, respectively, in consideration of the weight, and then, the addition result is input to the node 34. Thereafter, the matching cost value of the node 38 d(i–1,j) is added to the difference without the weight, and the addition result is also input to the node 34. Lastly, the smaller one of the two-addition results input to the node 34 is selected as the smallest matching cost value of the node 34.

Calculation of the smallest matching cost value of the node 34 may be expressed as follows:

$$D(i,j,m,n) = \min_{k \in [-1,0,1]}(D(i-1,j+k,m,n) + w_k |r(m)-t(n)|), \quad i,j=0, 1, \ldots, N-1 \quad (1)$$

wherein i denotes a processing step according to clock, j denotes a $j^{th}$ processing element, m denotes a reference pattern of an $m^{th}$ word, n denotes an $n^{th}$ test pattern, and $w_k$ denotes a weight that is set to 1 if k=1 and to 2 if k=1, –1.

In this way, calculation of the matching cost value of each node from the origin node 30 results in calculation of the smallest matching cost values of the uppermost nodes in the graph of FIG. 3. Also, calculation of the smallest one of the matching cost values of the uppermost nodes results in the smallest matching cost value of the reference pattern which is compared with the test pattern.

An order of detecting the value of each node using the dynamic time warping algorithm is not restricted if the smallest one of the values of the uppermost nodes can be obtained. According to one aspect of the present invention, the value of each node is detected in a diagonal direction as indicated with the dot lines in FIG. 3 so as to realize a device based on the dynamic time warping algorithm.

Figure 4:
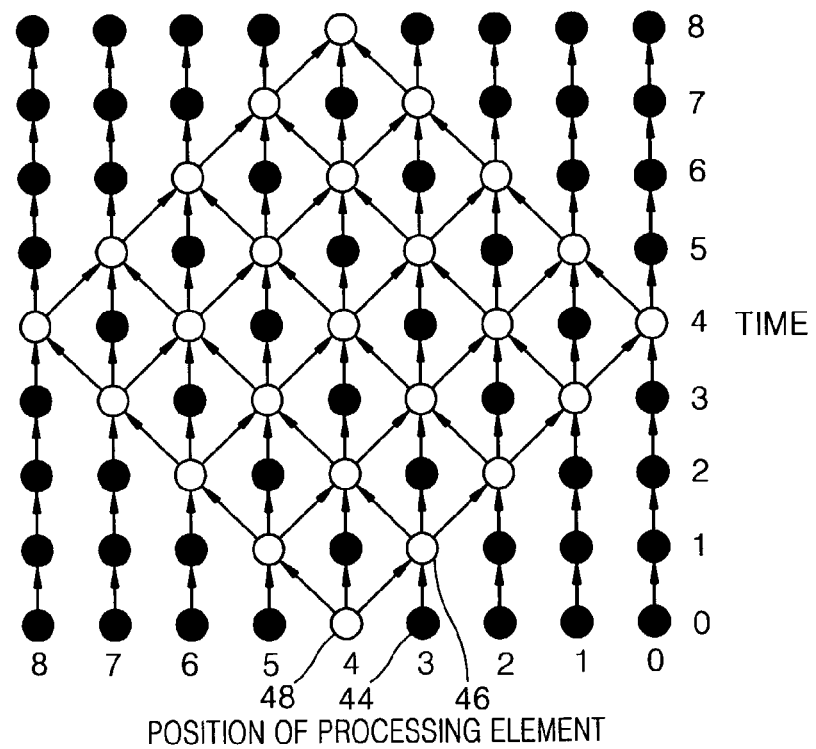
FIG. 4 is a diagram of the grid structure of the dynamic time warping method, in which the coordinates of the graph of FIG. 3 are changed.

FIG. 4 is a diagram of a dynamic time warping grid structure obtained by rotating the coordinates of the graph of FIG. 3 by 45 degree counterclockwise to be used in a dynamic time warping device, according to the present invention. Referring to FIG. 4, white circles are active nodes, nodes inside the big diamond denote processing elements, and black circles are inactive nodes that do not operate when the active nodes operate. Also, numbers in the x-axis direction represent the position of each processing element and numbers in the y-axis represent the pulse number of an operating clock applied to each processing element according to the course of time. If the count number of a clock is an even number, only processing elements corresponding to even numbered nodes are activated. Contrarily, where the count number of a clock is an odd number, only processing elements corresponding to odd numbered nodes are activated. In this case, a reference point for a $0^{th}$ clock refers to an instant of time when the matching cost values of characterization vectors of test and reference patterns, where the characterization vectors being input to a processing element 48, which is positioned in the middle of processing elements, are obtained. Inactivation means a period in which a processing element maintains a matching cost value, which was obtained in a previous clock, for one clock without calculating a matching cost value of a characterization vector. A matching cost value of an inactive processing element is calculated as follows:

$$D(i,j,m,n)=D(i-1,j,m,n), i,j=0, 1, \ldots, N-1 \qquad (2)$$

In FIG. 4, calculation of the smallest matching cost value between the test pattern and the reference pattern having five characterization vectors P, requires 2P−1 processing elements. For a $0^{th}$ clock, a value of a node, except for the processing element 48, which is initially set to an infinite value, so that the value from the processing element 48 in a next stage is selected as the smallest matching cost value. For instance, when a node 46 is activated in a first clock, its smallest matching cost value is determined with a value obtained in a node 48 instead of an infinite value which is an initial value of the node 44. In this case, the initial value of the fourth processing element 48 operating in the $0^{th}$ clock is set to 1, and a difference value between first characterization vectors of the test and reference patterns is calculated. When a clock is input, the smallest matching cost value of each node is calculated in the direction of arrows as indicated in FIG. 4.

Figure 5A:
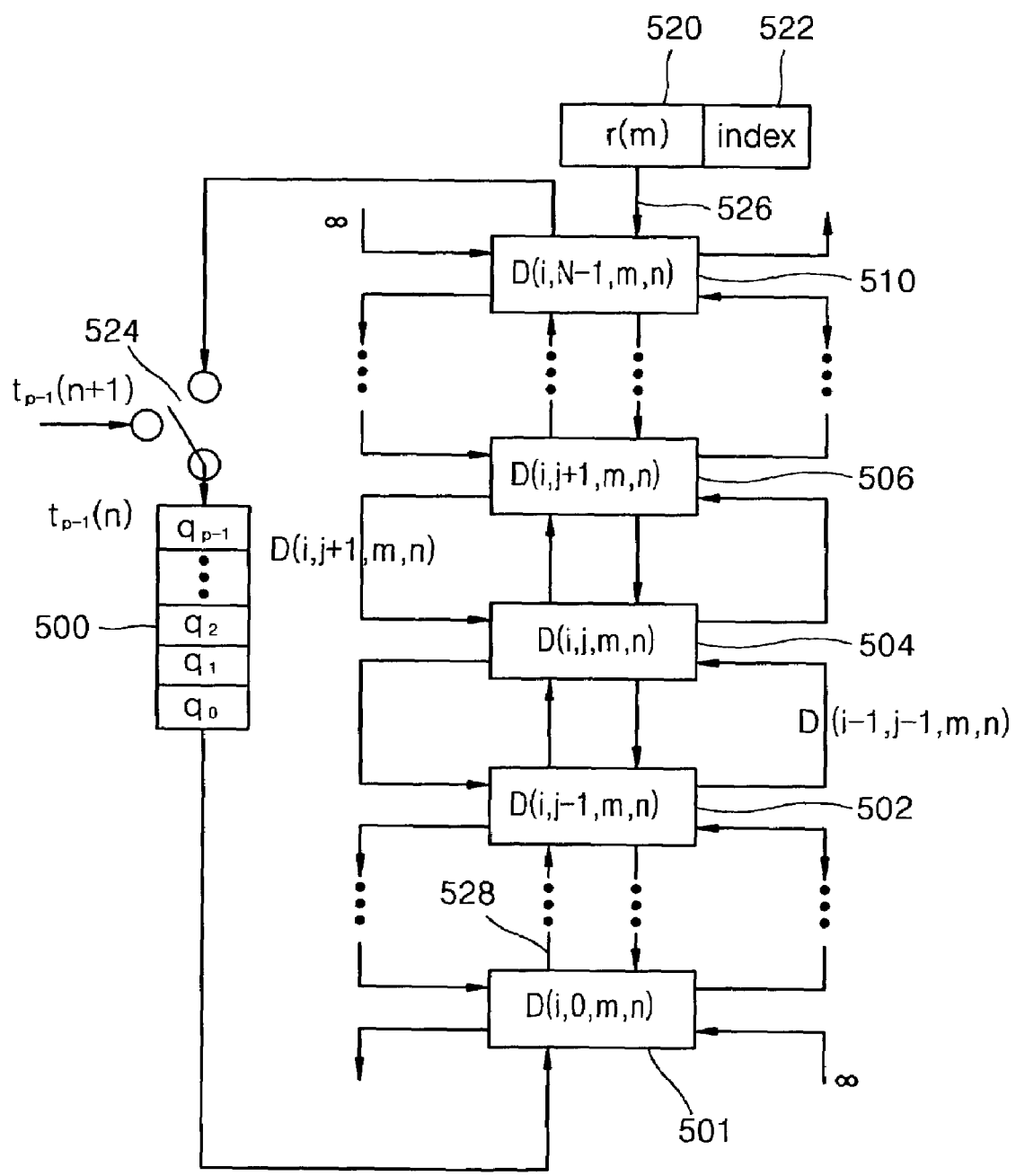
FIG. 5A is a block diagram of a dynamic time warping device, according to the present invention, for explaining a method for matching a test pattern and a reference pattern for i pulses of an operating clock (i=0, ..., N−1, where N is an integer)

FIG. 5A is a block diagram of a dynamic time warping device for explaining the matching of the test pattern and reference pattern for i pulses for an operating clock (i=0, . . . , N−1, where N is an integer), in which processing elements are serially combined according to the dynamic time warping grid structure of FIG. 4. The dynamic time warping device of FIG. 5A includes a test pattern memory unit 500 that receives P characterization vectors constituting a test pattern in chronological order in response to an operating clock signal (not shown), and a reference memory unit 520 that stores reference patterns corresponding to a plurality of words and outputs characterization vectors included in the reference patterns in chronological order. In the device of FIG. 5A, N processing elements are connected in serial, a processing element 501 at one side is connected to an output terminal of the test pattern memory unit 500, and a processing element 510 at the other side is connected to the reference pattern memory unit 520.

Figure 7:
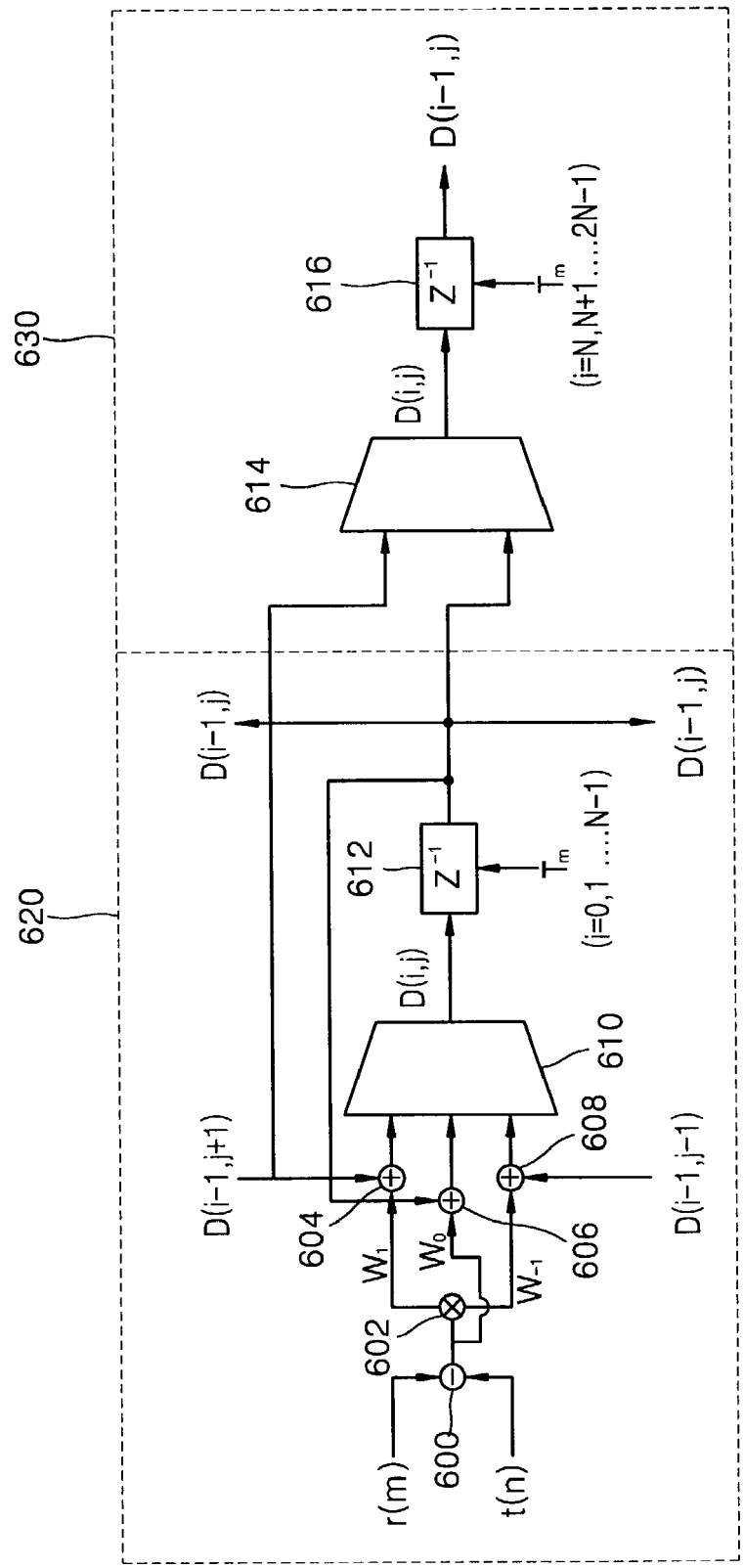
FIG. 7 is a circuit diagram illustrating in detail a processing element shown in FIGS. 5A through 6C.

In the operation of the device of FIG. 5A, the P characterization vectors are sequentially shifted from the test pattern memory unit 500 to processing elements 502, 504, 506, and 510 counterclockwise, in response to the operating clock signal. Here, the P characterization vectors are included in an $n^{th}$ test pattern $t_{p-1}(n)$ that is converted from an input speech signal, and the processing elements 502, 504, 506, and 510 have the same structures and are serially connected to the processing element 501. Next, characterization vectors included in a reference pattern r(m) with respect to an $m^{th}$ word in the reference pattern memory unit 520, are sequentially shifted to the processing elements 506, 504, and 502 via the processing element 510, i.e., in the opposite direction in the test pattern $t_{p-1}(n)$. For calculation of a matching cost value, the processing element 504, which is located in the midst of these processing elements, first calculates a difference between an input test pattern and an input reference pattern. Next, with respect to the processing elements 502 and 506 adjacent to the processing element 504, the difference which is not multiplied by a predetermined weight is added to the matching cost values obtained in an i−$1^{st}$ clock, i.e., matching cost values of nodes D(i−1, i−1, m, n) and D(i−1, i+1, m, n), and a matching cost value of a node (i−1, j, m, n) delayed in the processing element 504, respectively. Thereafter, the smaller one of the values obtained by the addition is determined to be the smallest matching cost value of a node D (i, j, m, n) at an $i^{th}$ clock. In this case, as shown in FIG. 4, for instance, the adjacent processing elements 502 and 506 are inactivated without calculating smallest matching cost values and, instead, are output as matching cost values calculated at a previous clock, during which the processing element 504 calculates the smallest matching cost value. This is possible by designing a dynamic time warping device such that a first comparing unit 610 for a smallest matching cost value of a processing element, which is illustrated in FIG. 7, operates once at the first one of the two input clocks and first comparing units (not shown) operate once at the $2^{nd}$ one of the two input clocks for a smallest matching cost while an adjacent processing element operates at the second clock. After completion of matching of an n test pattern $t_{p-1}(n)$, an n+1 test pattern $t_{p-1}(n+1)$ is input to the test pattern memory unit 500 through a switch 524.

As described above, characterization vectors of the test pattern $t_{p-1}(n)$ are subsequently shifted to each processing element, matched with a characterization vector of the reference pattern r(m), and stored in the test pattern memory unit 500. After each of the characterization vectors of the test pattern and the reference pattern is passed through all the processing elements, the smallest matching cost value for each node is stored in each processing element.

Figure 5B:
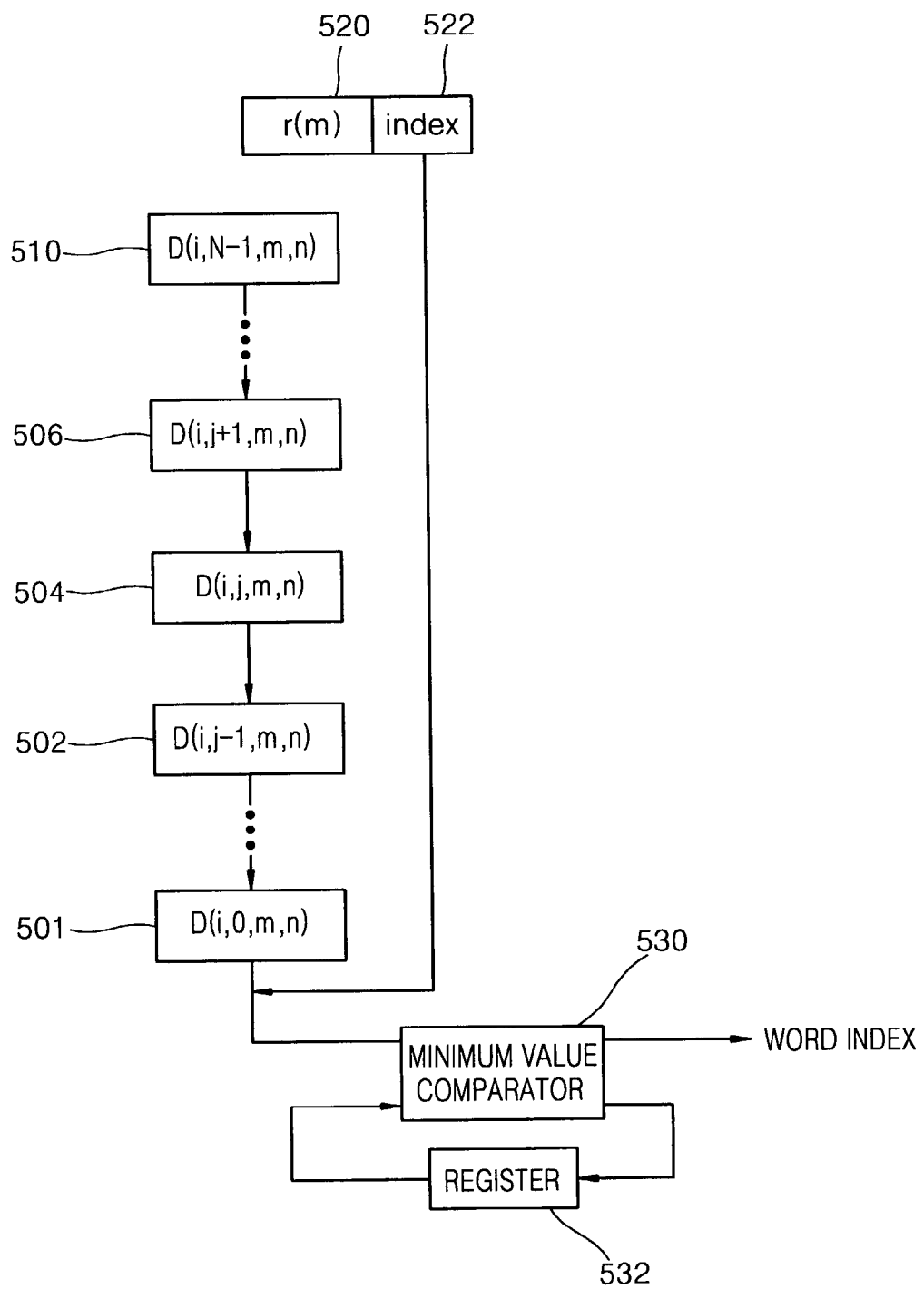
FIG. 5B is a block diagram of a dynamic time warping device, according to the present invention, for explaining a method for determining a smallest matching coast value for i pulses of an operating clock (i=N, ..., 2N−1, where N is an integer)

FIG. 5B is a block diagram illustrating a method of determining the smallest one of smallest matching cost values stored in the processing elements 501 through 510 of FIG. 5A for i pulses of the operating clock (i=N, . . . , 2N−1, where N is an integer). Referring to FIG. 5B, a reference memory unit 520, an index memory unit 522 that stores indexes corresponding to stored reference patterns, the processing elements 501 through 510 are the same elements as those illustrated in FIG. 5A and thus indicated with the same reference numerals.

A matching cost value is produced in each processing element during an $i^{th}$ clock (i=0, 1, . . . , N−1), and compared with that of a processing element (not shown) adjacent to the processing element 510 during an $i^{th}$ clock (i=N, N+1, . . . , 2N−1). The smallest value is sequentially compared with the matching cost values of the next processing elements and shifted in the direction of arrows so as to detect the smallest matching cost value of a reference pattern r(m). The detected smallest matching cost value is output to the smallest value comparing unit 530, and at the same time, an index corresponding to the reference pattern r(m) is output from the index memory unit 522 and output to the smallest value comparing unit 530. Here, the index memory unit 522 and the reference pattern memory 520 may be incorporated in one memory.

The smallest value comparing unit 530 reads the smallest matching cost values, which are obtained from previous reference patterns and stored in a register 532, from the register 532, and stores a smaller matching cost value and the index of a corresponding reference pattern in the register 532. After performing this process on all of the reference patterns, the index of a reference pattern having the smallest matching cost value is output so that a word corresponding to a test pattern can be recognized.

Figure 6A:
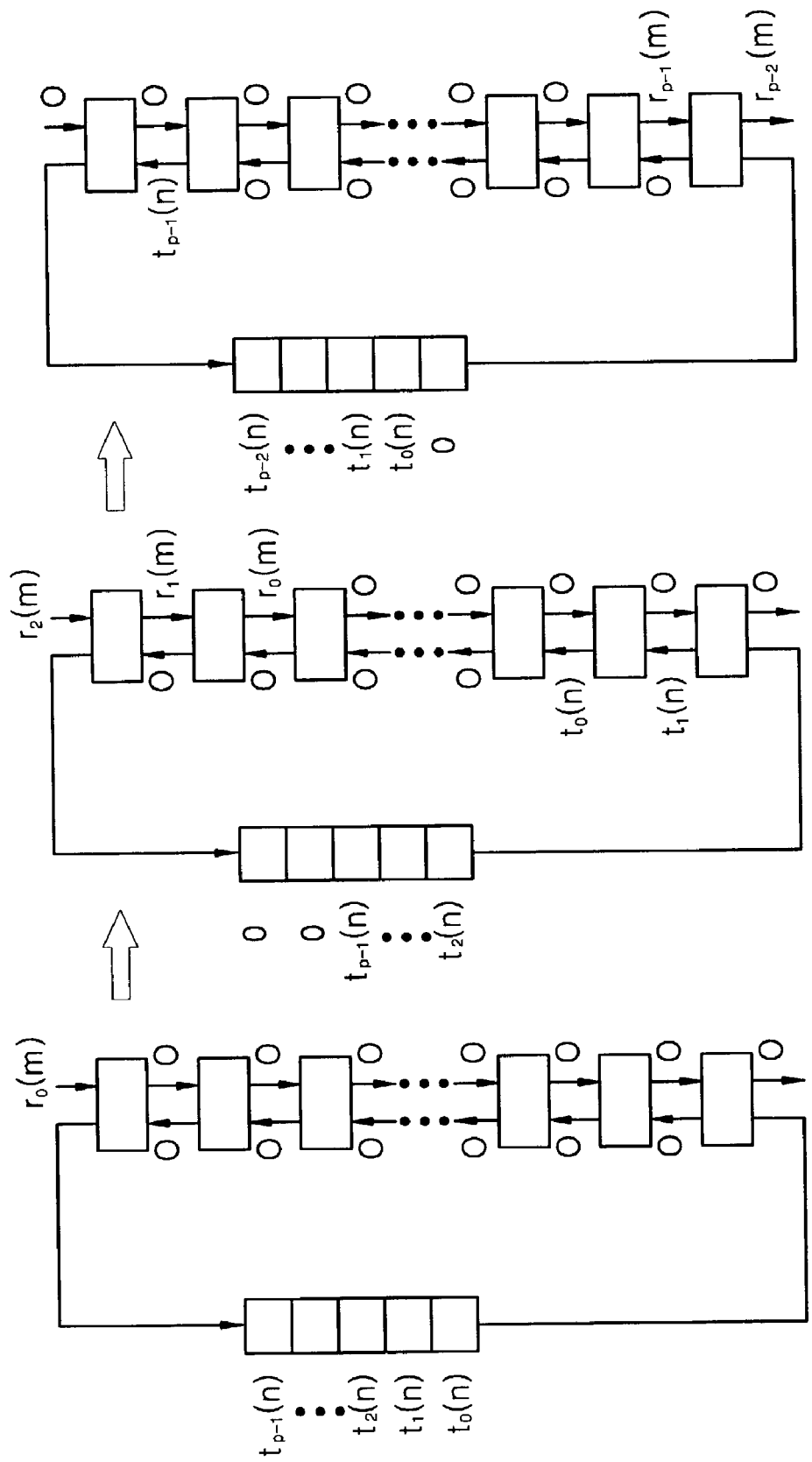
FIG. 6A is a diagram illustrating the flow of data in an $n^{th}$ test pattern and an $m^{th}$ reference pattern with respect to the dynamic time warping device of the FIG. 5A.

FIG. 6A is a diagram illustrating the flow of characterization vectors of an $n^{th}$ test pattern and an $m^{th}$ reference pattern in the processing elements and the test pattern memory unit of FIG. 5A. Referring to FIG. 6A, p characterization vectors $t_0(n), t_1(n), \ldots, t_{p-1}(n)$ of the $n^{th}$ test pattern that are stored in the test pattern memory unit 500 of FIG. 5A, and p characterization vectors $r_0(m), r_1(m), \ldots, r_{p-1}(m)$ of the reference pattern of an $m^{th}$ word, are sequentially shifted in a processing unit in response to a clock signal so as to match one test pattern with one reference pattern. The shifting direction of the p characterization vectors $t_0(n), t_1(n), \ldots, t_{p-1}(n)$ is opposite to that of the p characterization vectors $r_0(m), r_1(m), \ldots, r_{p-1}(m)$. Here, an apparatus and method for driving a clock are regarded as being well known by those skilled in the art, and therefore, descriptions thereof will be omitted.

Figure 6B:
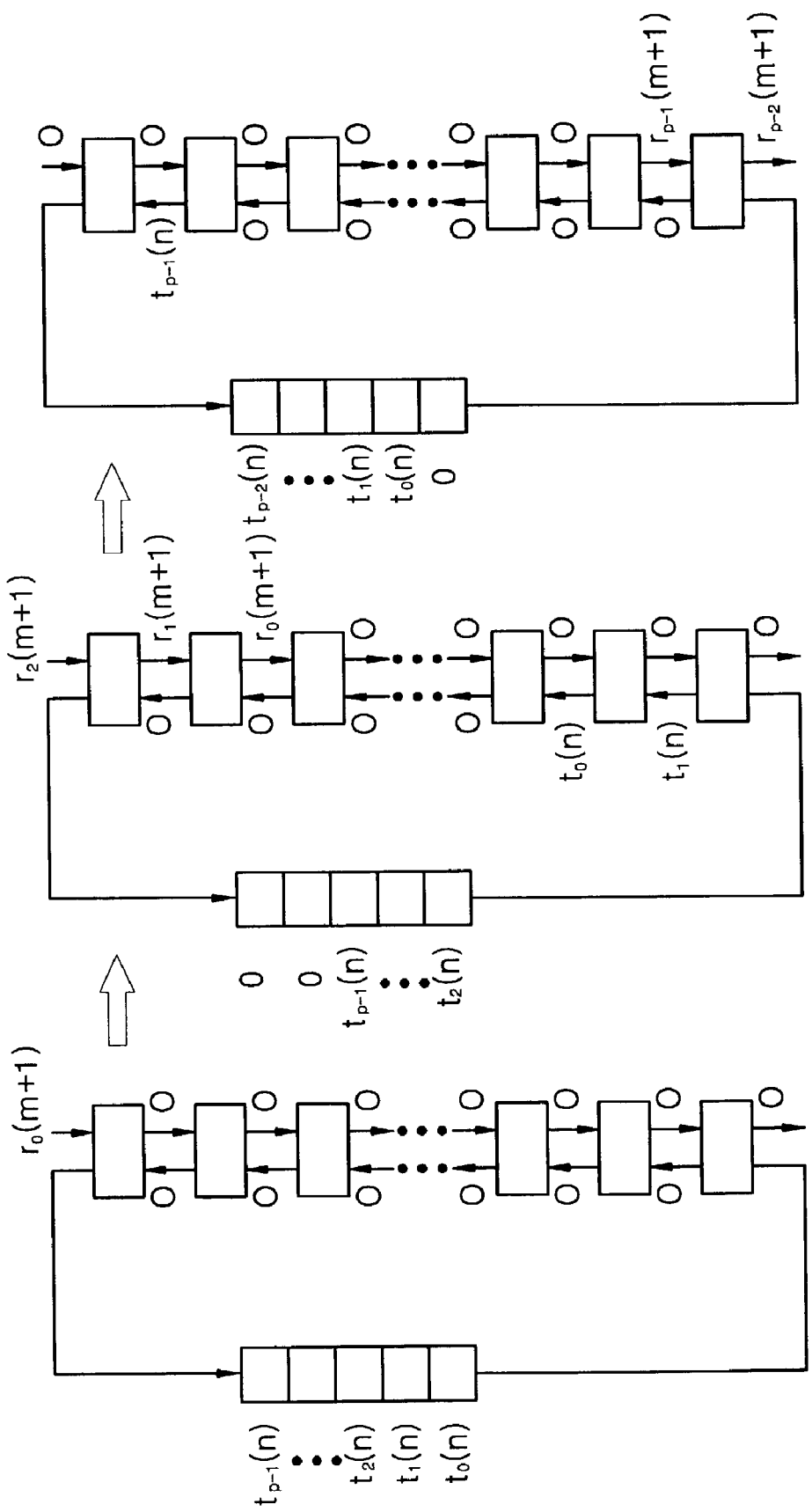
FIG. 6B is a diagram illustrating the flow of data in an $n^{th}$ test pattern and an $m+1^{st}$ reference pattern with respect to the dynamic time warping device of the FIG. 5A.

FIG. 6B is a block diagram illustrating the flow of characterization vectors of the $n^{th}$ test pattern and the $m+1^{th}$ reference pattern with respect to FIG. 5A. Referring to FIG. 6B, when a smallest matching cost of the $m^{th}$ reference pattern of FIG. 5A is obtained, a characterization vector $r(m+1)$ of a reference pattern corresponding to an $m+1^{th}$ word is sequentially input to processing elements to perform matching with the $n^{th}$ test pattern.

Figure 6C:
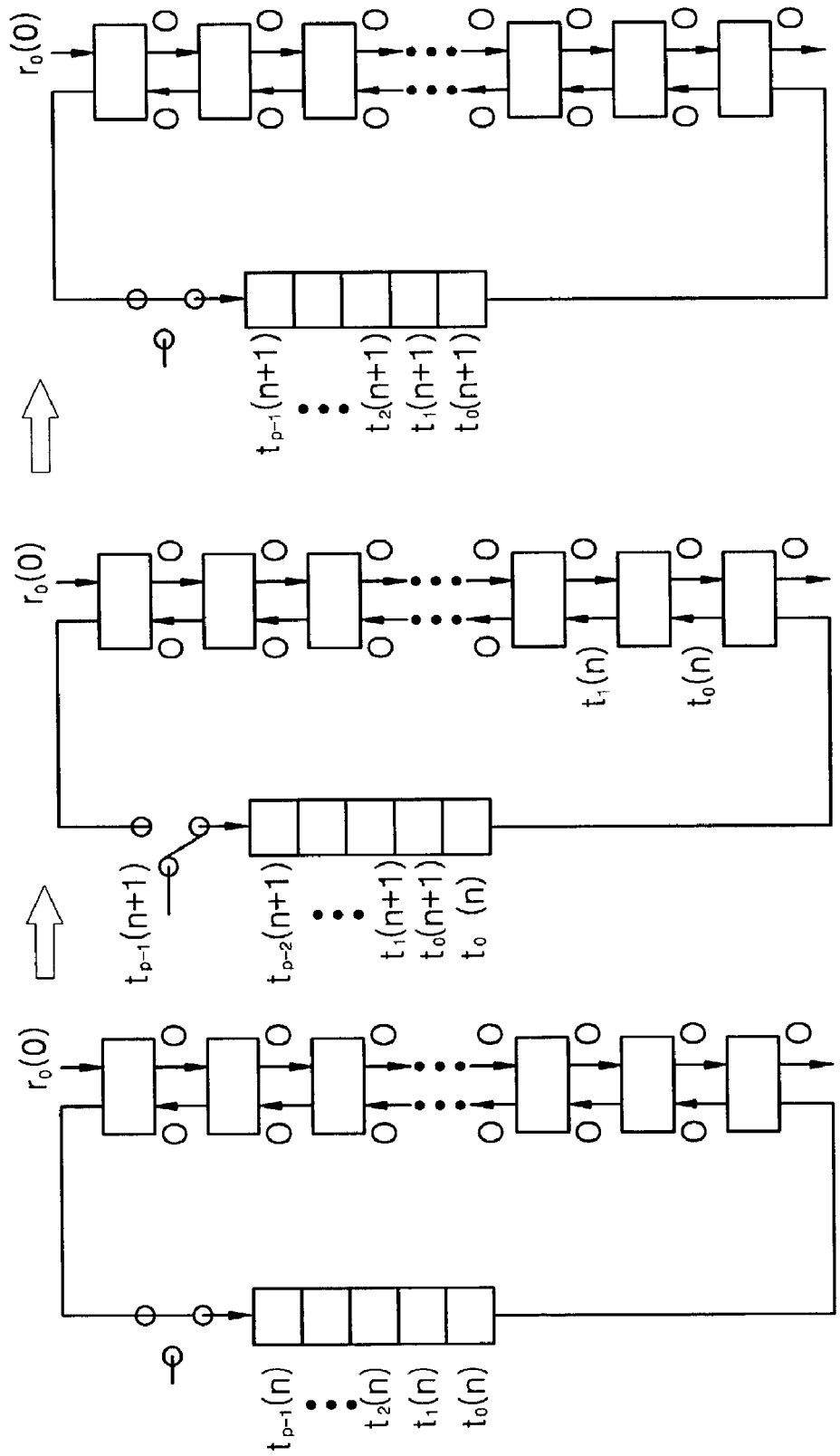
FIG. 6C is a diagram illustrating a process where an $n^{th}$ test pattern is switched to an $n+1^{th}$ test pattern, illustrated in FIG. 5A.

FIG. 6C is a diagram illustrating a process where the $n^{th}$ test pattern is switched to the $n+1^{th}$ test pattern as illustrated in FIG. 5A.

FIG. 7 is a circuit diagram illustrating in detail the structure of the processing elements shown in FIGS. 5A and 5B. Here, reference numerals 620 and 630 denote the first block of the operating processing element shown in FIG. 5A, and the second block of the operating processing element in FIG. 5B, respectively.

Referring to FIG. 7, when characterization vectors of a test pattern t(n) and reference pattern r(m) are input to a subtracter 600, a difference between the characterization vectors in t(n) and r(m) is input to first and third adders 604 and 608 via a double multiplier 602. As a result, the difference is added to a matching cost value that was produced at the clock right before a current clock and input from nodes D(i−1,j+1) and D(i−1,j−1) of adjacent processing elements. Also, the difference is added to a matching cost value obtained in a node right before a current node by second adder 606.

A smaller one of the values obtained by the addition is selected by a first comparing unit 610 and output as the matching cost value of the current node D(i,j). The matching cost is also fed back to the second adder 606 via a first delayer 612 and output to an output terminal so as to be applied to adjacent processing elements.

The second block 630 is a circuit block for detecting the smallest one from matching cost values obtained from all of the processing elements shown in FIG. 5B. In detail, a second comparing unit 614 compares a matching cost value of a node D(i−1,j+1) of a processing element (not shown) which is adjacent to the node D(i,j) of the processing element illustrated in FIG. 7. The comparison result is shifted to the next processing element via a second delayer 616 to output the smallest matching cost value.

While this invention has been particularly shown and described with reference to preferred embodiments thereof, it will be understood by those skilled in the art that various changes in form and details may be made therein without departing from the spirit and scope of the invention as defined by the appended claims.

As described above, according to the present invention, speech recognition software using a dynamic time warping algorithm is embedded into hardware, thereby enabling fast speech recognition. Also, the present invention can increase a recognition rate of speech by adjusting weight according to a node to be compared, and provide a dynamic time warping device that can be mass-produced as application-specification integrated circuits (ASICs). Further, a compact speech recognition apparatus using the dynamic time warping device according to the present invention can be provided without using a computer to drive software for speech recognition.

What is claimed is:

1. A dynamic time warping device for detecting a reference pattern having a smallest matching cost value with respect to a test pattern, the device comprising:

a test pattern memory unit for receiving P characterization vectors included in the test pattern in chronological order, shifting the received P characterization vectors using a first-in first out (FIFO) queue in response to an operating clock signal;

a reference memory unit for storing a plurality of reference patterns corresponding to a plurality of words, and outputting P characterization vectors included in the reference pattern in chronological order;

a processing unit to which (2P−1)=N processing elements are serially connected, first and second ends of the serially connected processing elements are connected to an output of the test pattern memory unit and the reference pattern memory unit, respectively, so as to shift the characterization vectors included in the test pattern, and to shift the characterization vectors included in the reference pattern in the opposite direction with respect to the previous shifted characterization vectors, each processing element calculating matching cost values using a difference between the characterization vectors and matching cost values of adjacent processing elements, and selecting the smallest one from the matching cost values produced in the processing elements to output the smallest value as the smallest matching cost value of an input reference pattern; and a matching result decision unit for outputting the index of a word of a reference pattern having the smallest matching cost value out of matching cost values of the plurality of reference patterns output from the processing unit;

wherein the processing element corresponding to a node (i,j) of the processing unit comprises:

a first circuit block including:
a subtracter outputting a difference between the characterization vectors of the test pattern and the characterization vectors of the reference pattern, both characterization vectors being input to the subtracter in chronological order;
a multiplier multiplying the difference by a predetermined weight;
first and third adders adding an output of the multiplier to smallest matching cost values of nodes D(i−1,j+1) and D(i−1,j−1), respectively;
a second adder adding an output of the subtracter to smallest matching cost values of a node (i−1,j);
a first comparator outputting the smallest matching cost value out of outputs of the first through third adders; and
a first delayer delaying the smallest matching cost value for one clock and outputting it as a matching cost value of the node (i−1,j); and a second circuit block including:
a second comparator receiving the matching cost value of the node D(i−1,j+1) and the matching cost value of the node D(i−1,j) output from the first delayer, and outputting the smallest value; and a second delayer delaying an output of the second comparator for one clock;

wherein i denotes a $0^{th}$ pulse of the operating clock defined when the characterization vectors of the test and reference patterns produce a value for firstly matching the central processing element, and being increased by 1 whenever a matching cost value is produced due to application of a clock to the processing element, and j denotes a $j^{th}$ processing element.

2. The device of claim 1, wherein the processing unit performs the operations of:

adding matching cost values to a difference between the characterization vectors of the test and reference patterns sequentially input from each processing element, where the matching cost values are produced by processing elements adjacent to the current processing element in response to a clock output right before a current clock, and the difference is multiplied by a weight;

selecting the smallest value out of the addition results as a smallest matching cost value of a processing element;

comparing smallest matching cost values produced by the adjacent processing elements in chronological order; and outputting the smallest matching cost value out of the matching cost values as the smallest matching cost between the test and reference patterns.

3. The device of claim 2, wherein an initial value of the processing element in the midst of the processing elements in the processing unit is set to 1, and those of the remaining processing elements are set to infinite values.

4. The device of claim 3, wherein adjacent processing elements of the processing unit alternately produce a smallest matching cost.

5. The device of claim 1, wherein the weight, which is multiplied by the difference by the multiplier, is set to 2.

6. The device of claim 1, wherein the first circuit block is executed at an $i^{th}$ pulse of the operating clock (i=0,1, ..., −1), and the second circuit block is executed at an $i^{th}$ pulse of the operating clock (i=N, N+1, ..., 2N−1).

7. A speech recognition apparatus comprising: an A/D converter converting an analog speech signal into a digital speech signal;

a characterization vector producing unit including filter banks and for producing characterization vectors of a test pattern from the digital speech signal;

a test pattern memory unit for receiving P characterization vectors included in the test pattern in chronological order in response to a clock signal, and shifting and outputting the P characterization vectors using a FIFO queue;

a reference pattern memory unit for storing a plurality of reference patterns corresponding to a plurality of words, and outputting P characterization vectors included in the reference patterns in chronological order;

a processing unit to which (2P−1)=N processing elements are serially connected, first and second ends of the serially connected processing elements are connected to an output of the test pattern memory unit and the reference pattern memory, respectively, so as to shift the characterization vectors included in the test pattern, and to shift the characterization vectors in the reference pattern in the opposite direction with respect to the previous shifted characterization vectors, each processing element calculating matching cost values using a difference between the characterization vectors and matching cost values of adjacent processing elements, and selecting the smallest matching cost value to output it as the smallest matching cost value of an input reference pattern; and a matching result decision unit outputting the index of a word of a reference pattern having the smallest matching cost value out of matching cost values of the plurality of reference patterns output from the processing unit;

wherein the processing element corresponding to a node (i,j) of the processing unit comprises:

a first circuit block including:

a subtracter outputting a difference between the characterization vectors of the test pattern and the characterization vectors of the reference pattern, both characterization vectors being input to the subtracter in chronological order;

a multiplier multiplying the difference by a predetermined weight;

first and third adders adding an output of the multiplier to smallest matching cost values of nodes D(i−1,j+1) and D(i−1,j−1), respectively;

a second adder adding an output of the subtracter to smallest matching cost values of a node (i−1,j);

a first comparator outputting the smallest matching cost value out of outputs of the first through third adders; and a first delayer delaying the smallest matching cost value for one clock and outputting it as a matching cost value of the node (i−1,j); and a second circuit block including:

a second comparator receiving the matching cost value of the node D(i−1,j+1) and the matching cost value of the node D(i−1,j) output from the first delayer, and outputting the smallest value; and a second delayer delaying an output of the second comparator for one clock, wherein i denotes a $0^{th}$ pulse of the operating clock defined when the characterization vectors of the test and reference patterns produce a value for firstly matching the central processing element, and being increased by 1 whenever a matching cost value is produced due to application of a clock to the processing element, and j denotes a $j^{th}$ processing element.

* * * * *